United States Patent [19]  
Jackson

[11] 3,789,229  
[45] Jan. 29, 1974

[54] WELDING CONTROL CIRCUIT AND METHOD
[75] Inventor: Robert V. Jackson, Los Angeles, Calif.
[73] Assignee: McCulloch Corporation, Los Angeles, Calif.
[22] Filed: June 5, 1972
[21] Appl. No.: 259,930

Related U.S. Application Data
[62] Division of Ser. No. 177,613, Sept. 3, 1971, abandoned.

[52] U.S. Cl. .................................. 290/40, 290/40 B
[51] Int. Cl. ............................................. H02p 9/04
[58] Field of Search .......................... 290/1, 40, 40 G

[56] References Cited
UNITED STATES PATENTS

| 3,597,623 | 8/1971 | Gilardi | 290/40 |
| 3,508,070 | 4/1970 | Barish et al. | 290/40 |
| 3,513,325 | 5/1970 | Tharp | 290/40 |
| 2,809,300 | 10/1957 | McFarland | 290/40 |
| 3,612,892 | 10/1971 | Nobile | 290/40 |
| 2,804,553 | 8/1957 | McFarland | 290/40 |
| 3,287,565 | 11/1966 | Lewis | 290/40 |
| 3,553,473 | 1/1971 | Meeks | 290/40 |
| 3,412,258 | 11/1968 | Satter | 290/40 |
| 3,471,769 | 10/1969 | Roesel | 290/40 |

Primary Examiner—G. R. Simmons  
Attorney, Agent, or Firm—Burns, Doane, Swecker & Mathis

[57] ABSTRACT

A voltage regulator and method are utilized in an automatic throttle control for an internal combustion engine driven inductor alternator. An SCR in series with the load is biased to conduct on successive positive half-cycles of a rectified a.c. input voltage. The SCR conductive bias is opposed responsively to the load voltage so that the average load voltage is a function of the number of complete pulses of the source in which the SCR conducts during a given time period. A hold-off circuit is provided to prevent SCR conduction during welding.

9 Claims, 4 Drawing Figures

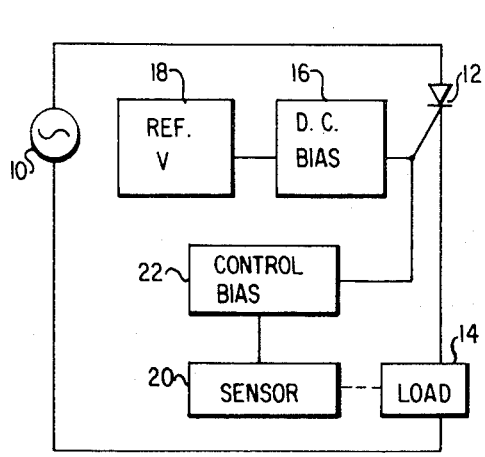
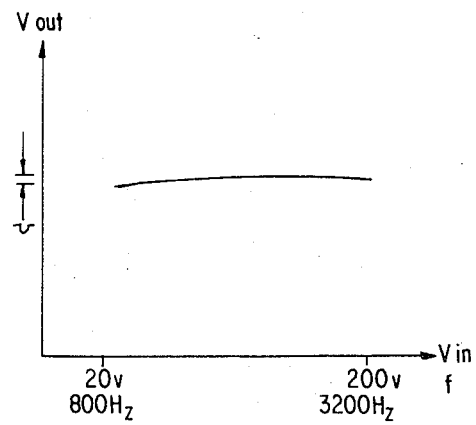
FIG.1  FIG.2
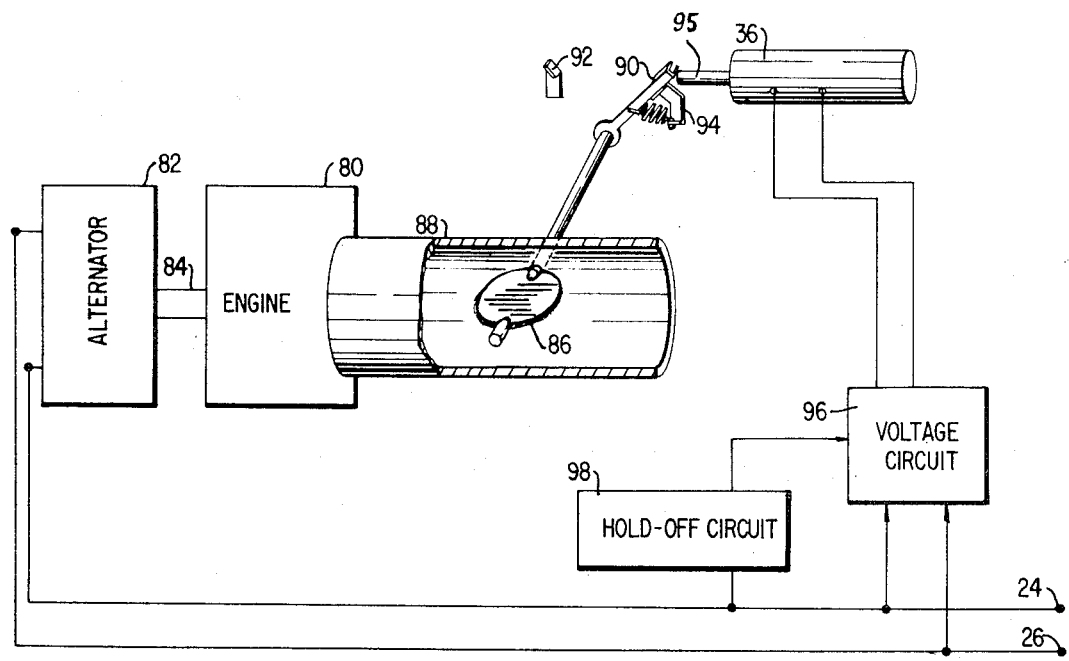
FIG.4

WELDING CONTROL CIRCUIT AND METHOD

This is a division, of application Ser. No. 177,613, filed Sept. 3, 1971 now abandoned.

BACKGROUND OF THE INVENTION

This invention relates to voltage regulators and more specifically to a voltage regulator particularly adapted for use with a small portable internal combustion engine powered inductor alternator.

Portable generators of this type are well known in the art. The output winding of the alternator is generally capacitatively compensated so that the internal impedance of the alternator, as seen from the arc welding load, is substantially resistive. Systems of this type normally have two electrical leads which are directly connected to the welding electrode and the work piece. A pneumatic valve located at the electrode holder has been used to operate the throttle control of the two-cycle internal combustion engine utilized to drive the alternator. Two pneumatic lines to the valve are customarily physically secured to the electrical lead to the welding electrode holder where the valve may be manually operated by the weldor. The air pressure generally utilized for operating prior art pneumatic controls of this type is derived from the pressure within the crankcase of the internal combustion engine.

Welding current is, of course, a function of the speed of the alternator and current control is achieved by varying the setting of the governor of the engine so that the alternator is driven at a predetermined speed to produce the required current. The engine is then selectively operated either at the governed speed or at idle as manually determined by the weldor.

As an improvement to the manually operated valve for actuating the throttle of the internal combustion engine, automatic controls have been proposed. Either voltage or current may be sensed in these systems to operate the throttle automatically. For example, an inductor alternator generally retains a small amount of residual magnetism and, although the engine is idling at a speed below the excitation speed of the generator, a small voltage is generated due to this residual magnetism. The grounding or the striking of the electrodes by the weldor significantly reduces this small voltage and the reduction in voltage can be sensed to effect operation of the internal combustion engine throttle. The demand for current which accompanies the striking of the welding arc may also be sensed to effect the operation of the engine throttle.

These known systems depend upon a solenoid to operate the throttle. The alternator voltage is not acceptable as the power supply for the engine throttle solenoid, despite the fact that there is a lot of power available from the internal combustion engine, because the frequency and the voltage of the alternator fluctuates widely with engine speed and with the demands of the load. Thus, some external source of power such as a battery or the internal combustion engine of the vehicle utilized to transport the welder is required to provide the voltage for solenoid operation. This external source of power increases the weight, volume and expense of the welder and may limit the portability of the welder.

As an example of the variations in the voltage available on such machines, the McCulloch Model No. 170 Arc Welder produces, from the minimum-to-maximum governor settings and from no load to a short circuit condition, an a.c. armature voltage variation of about 30 to about 160 volts r.m.s. with a corresponding field voltage variation of about 20 to about 130 volts d.c. A typical pop-in load with the minimum-to-maximum governor settings will produce an armature voltage variation of about 30 to about 105 volts a.c. and a field voltage variation of about 30 to 95 volts d.c.

One approach of the prior art has been the design of a solenoid which would operate over these varying voltages. However, the requirements of sensitiveity for operation by, for example, a 20-volt d.c. signal, is incompatible with the power dissipation required when operating at 130 volts d.c. Since the power loss is an I$^2$R function and the resistance of the solenoid coil is substantially constant, doubling the voltage from 20 to 40 volts with an accompanying doubling of the current will increase the amount of power which must be dissipated in the coil by a factor of four. The problems associated with the power dissipation which accompanies a 130 volt or 6 fold increase in the current are enormous.

Variable phase control means such as thyratrons and their solid state equivalents, silicon controlled rectifiers, have been proposed. Such systems have utility only where the frequency of the source is stable since the phase angle between the anode-cathode potential and the triggering or conduction initiating signal is critical. Since the frequency of the inductive alternator signal may vary by as much as a factor of four the usefulness of this type of control is quite limited.

Series regulators have also been proposed. These variable impedance devices in the load circuit of the alternator must, however, dissipate all of the power above level at which regulation is desired. With the tenfold variation in current that may occur in welding generators of this type, the quantum of power to be dissipated renders this type of control unsatisfactory.

It is, accordingly, an object of the present invention to obviate the difficiencies of the prior art and to provide a novel method and automatic control for an internal combustion engine driven alternator.

It is another object of the present invention to provide a novel method and system which eliminates the necessity for an external source of power to supply the operating voltage to the engine throttle controlling solenoid of a welder.

It is still another object of the present invention to provide a novel method and system for providing a stable or regulated voltage suitable for supplying the power to the engine throttle controlling solenoid of a welder.

It is yet another object of the present invention to provide a novel method and non-power dissipating system for regulating a solenoid energizing voltage below the minimum field voltage or armature voltage so that the solenoid coil sensitivity is maintained without the problems associated with power dissipation.

It is still a further object of the present invention to provide a novel method and system for energizing the solenoid of a welder which is non-responsive to variations in the frequency of the voltage to be regulated.

These and other objects and advantages are achieved through the utilization of a novel method and apparatus for voltage regulation in which the input voltage may vary in frequency through a range of 4-to-1 or more at a voltage range of 10-to-1 or more, and in which output load conditions may vary from zero to the maximum rating of the welder.

It is thus an object of the present invention to provide a novel voltage regulator and method operable over a 10-1 variation in input voltage.

It is a further object of the present invention to provide a novel voltage regulator and method operable over a 4-to-1 variation in the frequency of the input voltage.

Still a further object of the present invention is to provide a novel voltage regulator and method operable over a 4-to-1 variation in speed of the alternator producing the input voltage.

Yet a further object of the present invention is to provide a novel voltage regulator and method in which the output voltage is a function of the number of integral half-cycles of the voltage source.

These and other objects and advantages of the present invention will be apparent to one skilled in the art to which the invention pertains from the claims and from a perusal of the following detailed description of a preferred embodiment when read in conjunction with the appended drawings.

THE DRAWINGS

FIG. 1 is a functional block diagram of the system of the voltage regulator of the present invention;

FIG. 2 is a graph showing the variation in output voltage of the voltage regulator of FIG. 1 with respect to variations in input voltage and alternator speed.

FIG. 4 is a schematic illustration of a welder utilizing the circuit of FIG. 3.

THE DETAILED DESCRIPTION OF A PREFERRED EMBODIMENT

Figure 3:
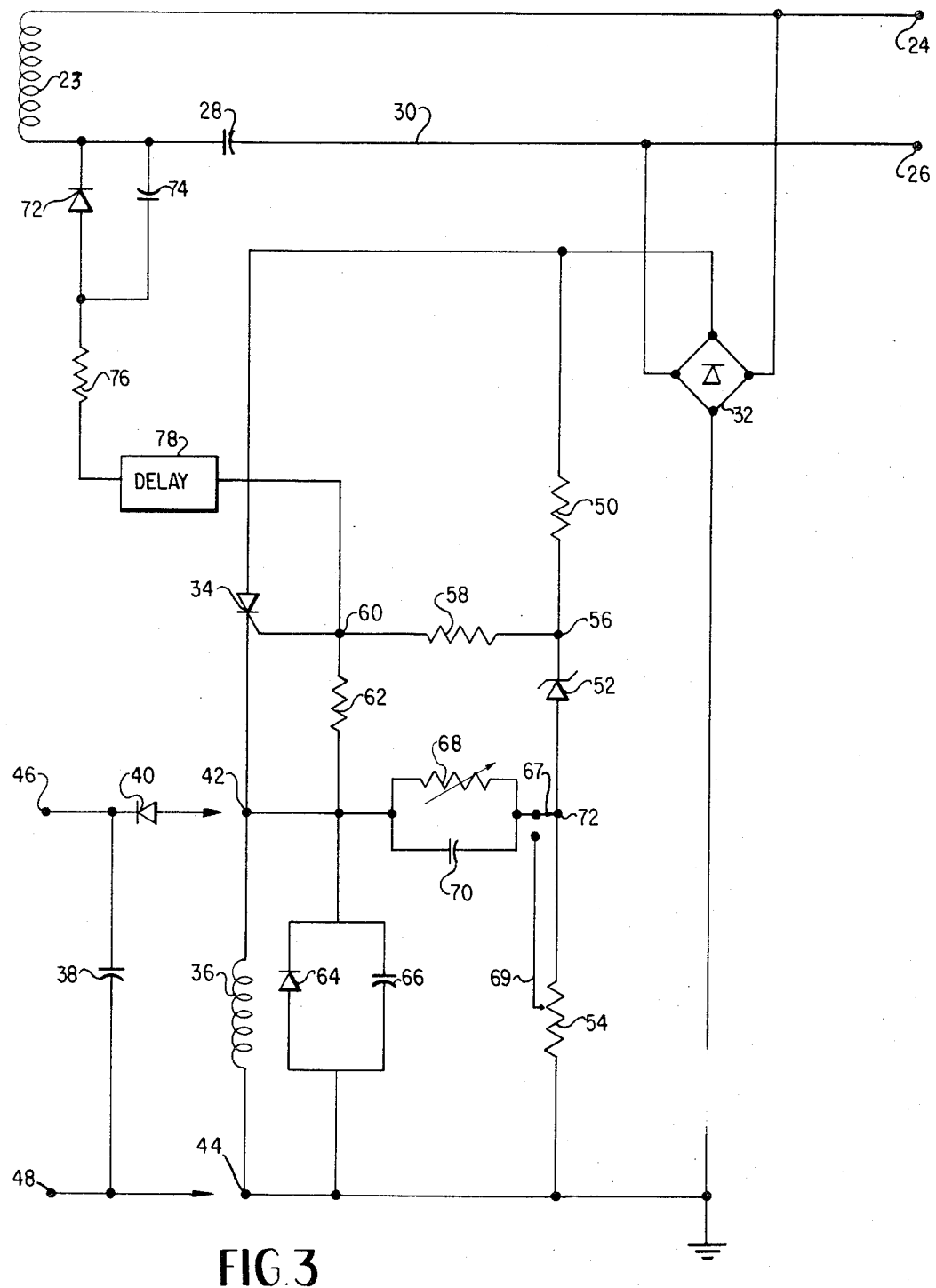
FIG. 3 is a schematic circuit diagram of a preferred embodiment of the voltage regulator of FIG. 1 as utilized in a welder.

An understanding of the present invention may be facilitated by reference to the detailed description set out in accordance with the following table:

TABLE OF CONTENTS

1. Voltage Regulator (FIGS. 1 and 2)
2. Welder Control (FIGS. 3 and 4)
   A. Circuit Description
   B. Hold-off Circuit
   C. Operation
3. Advantages and Scope of Invention

1. Voltage Regulator

With reference now to FIG. 1, a source of alternating current 10 is shown schematically in series with a silicon controlled rectifier (SCR) 12 and a load impedance 14. Means 16 are provided for biasing the trigger electrode of the SCR with sufficient d.c. voltage so that the SCR is turned on every half-cycle or, if self-rectifying as shown in the drawing, every other half cycle of the a.c. source 10. The level of the bias provided the trigger electrode of the SCR 12 by the bias means 16 may be selectively adjusted by varying the voltage of a d.c. reference 18.

A sensor 20 is provided to sense the voltage across the load impedance 14 and to adjust, in response thereto, the additional bias to the trigger electrode of the SCR 12 provided by the control bias means 22 in opposition to the bias from the d.c. bias means 16. The control bias means 22 is operative to prevent the SCR from turning on for a particular positive half-cycle of the source 10.

As is well known, the SCR 12 can conduct only when the anode is positive with respect to the cathode. Once conduction is initiated by the application of voltage of the requisite magnitude to the trigger electrode, the SCR 12 will conduct until the necessary anode to cathode bias is removed.

In operation, the d.c. bias means 16 is effective to initiate conduction of the SCR 12 during each of the positive half-cycles of the source 10. Conduction of the SCR 12 is extinguished during the negative half-cycles of the source 10. While the source 10 illustrated provides an a.c. signal, the signal applied across the SCR 12 and load impedance 14 may be any series of current pulses such as an interrupted d.c. signal, a.c. signal or a full or half-wave rectified a.c. signal. The signal must provide sufficient anode to cathode bias for SCR conduction, and the level of this anode to cathode bias must from time to time drop below this critical conduction level to interrupt the conduction of the SCR.

As opposed to the customary phase control to which SCRs are particularly adapted, i.e., delaying the initiation of conduction to thereby vary the percentage of conduction of each half-cycle, the present invention utilizes the SCR 12 as a switch to suppress conduction during complete positive half-cycles of the source 10. The voltage across the load 14 may be filtered as desired and regulation of the average load voltage achieved by varying the number of complete half-cycles of the current from source 10 which are applied thereto in a given time period.

As in the example shown in FIG. 2, the average output or regulated voltage v across the load 14 has been held to within a few millivolts of a desired value during a frequency variation of the source 10 or from about 800 Hz. to about 3,200 Hz. at a voltage variation of the source 10 of from about 20 volts rms to about 200 volts rms.

2. Welder Control

A. Circuit Description

With reference now to FIG. 3 wherein the voltage regulator illustrated in FIG. 1 is illustrated as an automatic throttle control for an internal combustion engine driven inductor alternator, the armature winding 23 of the alternator is shown connected to a pair of welding electrode terminals 24 and 26.

The alternator may be, for example, the McCulloch Corporation Model 170 Welder, the circuitry of which is disclosed in the Jackson Letters Pat. No. 3,204,173 and herein incorporated by reference. As disclosed in the said Jackson patent, a compensating capacitor 28, typically 70 microfarads, is connected in the electrical lead 30 so that the impedance of the alternator, as seen from the terminals 24 and 26, is substantially resistive.

With continued reference to FIG. 3, the voltage from an a.c. source 23 may be full wave rectified in a conventional diode bridge 32 and applied across an SCR 34 and an inductive load impedance 36. The load impedance 36 serves as the actuating coil of a solenoid utilized to control the throttle of the internal combustion engine which drives the alternator.

The full wave rectifier 32 may be replaced by a half wave rectifier or the rectification inherently provided by the SCR may be utilized if conduction during every second half-cycle of the source 23 is acceptable.

As earlier mentioned in connection with FIG. 1, the load impedance 36 may be either resistive or inductive as shown in FIG. 3 but cannot be capacitive unless isolated from the cathode of the SCR by a diode so that the voltage on the capacitive load is not reflected back to the cathode of the SCR to prevent the conduction thereof. For example, a capacitor 38 may be connected through a diode 40 across the terminals 42 and 44 and the inductor 36 omitted. The capacitor 38 may, of course, be utilized as a filter to provide a regulated voltage on a pair of output terminals 46 and 48.

With continued reference to FIG. 3, the SCR 34 and load impedance 36 are paralleled by a voltage divider network comprising a resistor 50, a Zener diode 52, and a resistor 54. The resistor 50 - Zener diode 52 junction 56 is connected through a current limiting resistor 58 to a terminal 60 of the trigger electrode of the SCR 34. The terminal 60, i.e., the trigger electrode of the SCR 34, is also connected to the cathode of the SCR 34 through a resistor 62. The load 36 is paralleled by a diode 64 and capacitor 66 and the cathode of the SCR 34 is connected through a resistor 68 in parallel with a capacitor 70 to the resistor 54 - Zener diode 52 junction 72.

The capacitor 66 is necessary for inductive or resistive loads but the diode 64 may be eliminated for a resistive load. As earlier explained, the alternating current input may be full or half-wave rectified, but must be periodically returned to zero to quench the conduction of the SCR 34.

The resistor 68 - capacitor 70 parallel combination serves with the resistor 54 as a voltage divider across the load impedance 36 and as a filter with a relatively long-time constant to provide a d.c. bias for the SCR 34. The capacitor 70 is charged by the load voltage. This voltage appears substantially across the Zener diode 52 and the resistor 62, since the voltage drop across current limiting resistor 58 is quite small. An increase in the voltage across the load impedance 36 will provide a bias to the trigger electrode of the SCR 34 to prevent the conduction thereof.

The forward or conductive bias applied to the trigger electrode 60 of the SCR 34 may be selectively varied by the use of a switch 67 and/or a sliding contact 69 on the resistor 54.

2. Hold-off Circuit

When utilized in the welding circuit illustrated, an additional hold-off circuit may be provided as illustrated in FIG. 3. The hold-off circuit includes a diode 73 and capacitor 74 connected in parallel and connected between the alternator winding 23 and compensating capacitor 28 and is operative to apply the alternator a.c. output voltage related potential to the trigger electrode of the SCR 34 through a small current limiting resistor 76.

C. Operation

When the welding arc is struck and current flows from the alternator winding 23 through the line 30 to the welding electrode terminals 24 and 26, the potential on the capacitor 28 is applied by way of the hold-off circuit to the trigger electrode of the SCR 34 to insure that the SCR 34 does not conduct. The voltage on the capacitor 28 only exists during the welding operation because of the otherwise open circuit between the terminals 24 and 26 and acts to override the voltage regulator. An optional conventional time delay circuit 78 may be added to the hold-off circuit to prevent the inadvertent operation of the SCR 34 with a momentary break in the welding arc.

The operation of the welder control circuit of FIG. 3 may be more easily understood with reference to the schematic diagram of FIG. 4. With reference to FIG. 4, an internal combustion engine 80 drives an inductive alternator 82 by means of a shaft 84. The throttle valve 86 in the intake line 88 is controlled between an idle position where the throttle actuating arm 90 abuts a mechanical stop 92 and a fully "on" position where the arm 90 abuts a variably positioned mechanical stop 94. The position of the stop 94 determines the speed of the engine and thus the welding current provided by the alternator 82 to the welding electrode terminals 24 and 26.

In operation, the throttle arm 90 is spring biased into the fully "on" position against the stop 94. The voltage produced by the alternator is operative through the voltage circuit 96 illustrated in FIG. 4 to provide the energization of the solenoid coil 36 thereby extending the rod 95 to hold the throttle arm 90 in the "idle" position against the stop 92.

When the welding arc is struck and the circuit between the terminals 24 and 26 completed, the hold-off circuit 98 of FIG. 4 is operative to sense the welding current and to override the voltage circuit 96 and to de-energize the solenoid coil 36. Thus, the solenoid is activated and the engine 80 operates at "idle" speed only when the engine 80 is running and welding is not in progress. The circuit of FIG. 3 thus distinguishes between an open circuit and a closed circuit with welding in progress.

In addition, when welding is not in progress, the speed of the alternator and thus the amplitude and frequency of the voltage from the alternator may vary from some maximum immediately after extinguishing the welding arc to some minimum after the alternator speed has been reduced. The solenoid must thus be operable under extreme frequency and voltage variations to position and to hold the throttle at the idle position. The regulator of the present invention is effective to maintain the desired solenoid voltage under these varying conditions.

3. Advantages and Scope of the Invention

By means of the novel welding circuit disclosed, the engine throttle is open for engine starting, closes automatically to "idle" speed after the engine is started, and automatically opens when the welding arc is struck. The utilization of the novel voltage regulator disclosed permits the energization of the throttle solenoid from the alternator with widely varying voltage, current and frequency parameters. The power dissipation problems associated with dissipative regulation systems and the frequency dependency of phase control system are thus avoided. Moreover, solenoid sensitivity can be maintained without severe problem of power dissipation therein.

The voltage regulator of the present invention may be embodied in other specific forms without departing from the spirit or essential characteristics thereof. The presently disclosed embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein. For example, the degree of regulation may be enhanced by the cascading of SCRs to provide the desired degree of sensitivity and current carrying capacity generally limited in large current carrying devices.

What is claimed is:

1. A method of automatically controllling the energization of the throttle solenoid of an internal combustion engine driving an inductive alternator comprising the steps of:
   a. applying current from the alternator to an SCR in series with the throttle solenoid;
   b. biasing the SCR to conduct during like half-cycles of the alternator to supply current from the alternator to the throttle solenoid;
   c. sensing the voltage across the throttle solenoid; and
   d. maintaining the solenoid voltage by opposing the conduction biasing of the SCR responsively to the sensed solenoid voltage.

2. The method of claim 1 including the further steps of sensing the striking of a welding arc and inhibiting the conduction of the SCR responsively thereto.

3. The method of claim 1 including the further step of rectifying the output voltage of the alternator and energizing the SCR and the throttle solenoid with the rectified alternator output voltage.

4. The method of claim 1 wherein the SCR is biased into conduction and into non-conduction for substantially complete half-cycles of the alternator voltage.

5. The method of claim 1 wherein the combustion bias and conduction-opposing bias are applied to the trigger electrode of the SCR.

6. A welder comprising:
   an inductive alternator;
   an internal combustion engine drivingly connected to said alternator, said engine having a throttle biased into an open position;
   means responsive to alternator voltage for actuating said throttle to an idle position;
   means for regulating the alternator voltage applied to said throttle activating means to a substantially constant value; and,
   means responsive to alternator current to override said throttle actuation means whereby said throttle is returned to said open position.

7. A method of controlling the throttle solenoid of an internal combustion engine driving an inductive alternator comprising the steps of:
   a. biasing the engine throttle into an open position;
   b. energizing the throttle solenoid with alternator voltage to hold the throttle in the idle position;
   c. regulating the throttle solenoid energization voltage to a substantially constant value; and,
   d. overriding throttle solenoid energization responsively to the alternator current to de-energize the throttle solenoid, thereby permitting the throttle bias to return the throttle to the open position.

8. The method of claim 7 including the step of delaying the overriding of the throttle energization means by a predetermined amount.

9. The welder of claim 6 wherein said alternator current responsive means includes means for delaying the response of said throttle energization means by a predetermined amount.

* * * * *